United States Patent [19]
Streckert

[11] 3,789,979
[45] Feb. 5, 1974

[54] VENEER HANDLING APPARATUS
[76] Inventor: Thomas Streckert, Abbottsford, Wis.
[22] Filed: Feb. 17, 1972
[21] Appl. No.: 227,153

[52] U.S. Cl............... 209/73, 209/74, 209/82, 209/111.7, 198/21
[51] Int. Cl............................................ B07c 5/342
[58] Field of Search... 209/73, 74, 111.7, 111.6, 82; 198/21; 271/64

[56] References Cited
UNITED STATES PATENTS
| | | | |
|---|---|---|---|
| 2,933,185 | 4/1960 | Coleman et al. | 209/111.7 X |
| 3,215,269 | 11/1965 | Walters | 209/73 |
| 2,876,815 | 3/1959 | Rogers | 209/82 X |
| 2,740,521 | 4/1956 | Calvin | 209/82 |

*Primary Examiner*—Allen N. Knowles

[57] ABSTRACT

An improved material transferring system that permits reliable movement of material from one location through one or more angled movements to a second location. The transferring system is designed to handle irregular material such as veneer which may be warped, buckled, or torn without loss in reliability, and may be used in the transfer of veneer from the outfeed of a veneer splicer back to a load near the infeed of the same or another splicer. The transfer system can also automatically sense finished veneer pieces, and send them to a different location.

15 Claims, 4 Drawing Figures

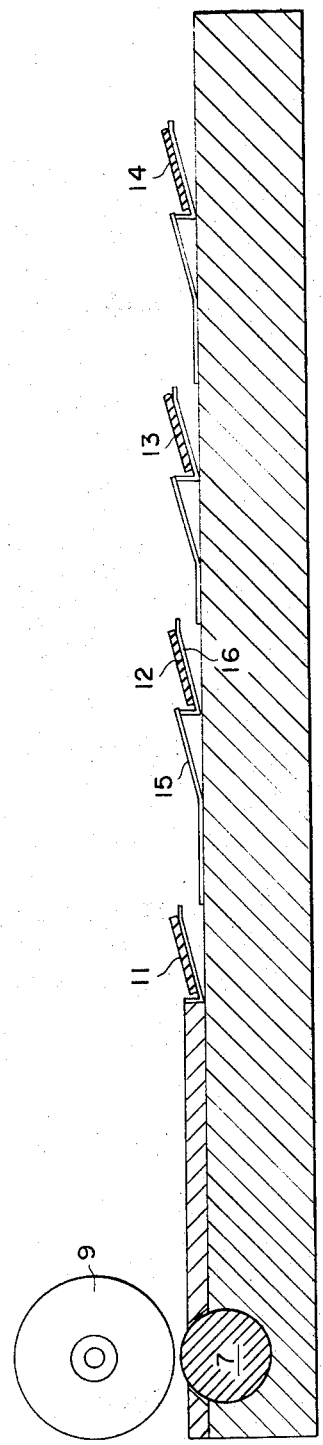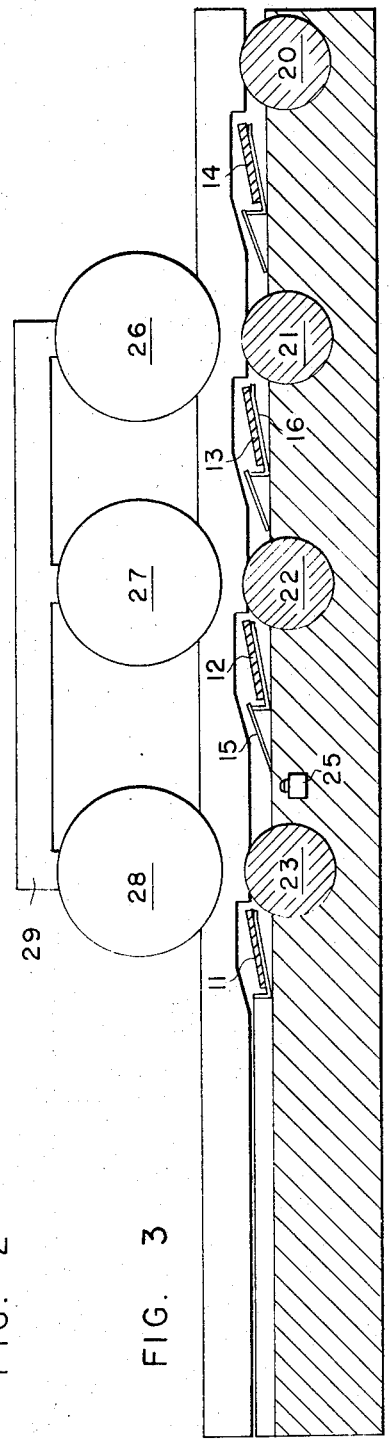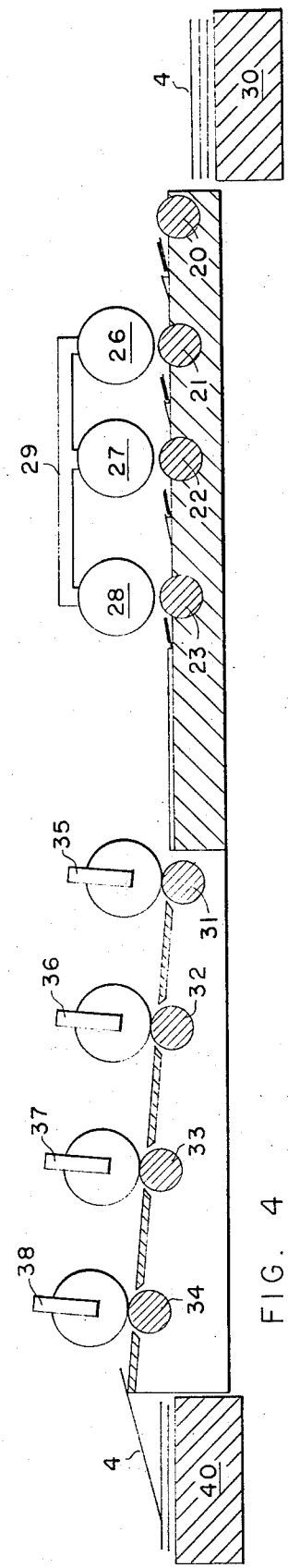

VENEER HANDLING APPARATUS

BACKGROUND OF THE INVENTION

There has been a definite need for a conveying system that would move material through one or more angled movements, including right angles. One method of accomplishing this has been the use of belts to move the material to the point of transfer, where it is then raised upon a set of driven rolls that are normally recessed between the belts. The driven rolls then carry the material over the belts and onto the next set of belts, which may run perpendicularly to the first set of belts.

Certain operations in the veneer industry require conveyor systems utilizing right angle transfers. Veneer consists of extremely thin strips of wood, generally being from one-fourth to one-fortieth of an inch thick, and is rather prone to splitting, warping, and buckling under the influence of known conveyor systems. Therefor is is very common to have defective strips of veneer twist or shift out of place often interrupting normal conveyor action. The conveyor may even jam up due to the catching or snagging of defective veneer strips.

The present invention uses a novel combination of belts, rolls, and fixed and movable hold-downs, providing a reliable transferring system for any type of veneer. The present system may also be used for conveying and transferring other materials, especially those that are typically thin and difficult to handle as is veneer.

SUMMARY OF THE INVENTION

One object of the present invention is to provide a transfer system that permits reliable movement of material from one location through one or more angled movements to a second location or subsequent locations.

Another object of the present invention is to provide a transfer system capable of sorting material according to the width of the material.

Another object of the invention is to provide a means of reliably transferring material from the output of a machine back to the input area of the same machine.

Another purpose of the present invention is to provide a transfer system capable of sorting and piling material.

Another purpose of the invention is to provide a means of piling material at the optimum level for operation of the next manufacturing process.

Other objects and advantages of the present invention will become apparent as the specification proceeds.

The present invention includes roller means for transferring veneer sheets from a veneer spicer to a transporting and sorting assembly. The transporting and sorting assembly includes inclined guarded belts for receiving the sheets and moving them into operative communication with sensing means capable of measuring the width of the sheet. In response to the signal from the sensing means, the sheet may be transported in a first or second direction to a stack of finished sheets or to the infeed of the splicer respectively.

DESCRIPTION OF PREFERRED EMBODIMENTS

The present invention will be described in greater detail by reference to the accompanying drawings in which:

FIG. 2 is a partial side view in section taken along line 2—2 in FIG. 1.

FIG. 3 is a partial side view in section taken along line 3—3 in FIG. 1.

FIG. 4 is a side view in section of a portion of the apparatus taken along line 4—4 in FIG. 1.

Figure 1:
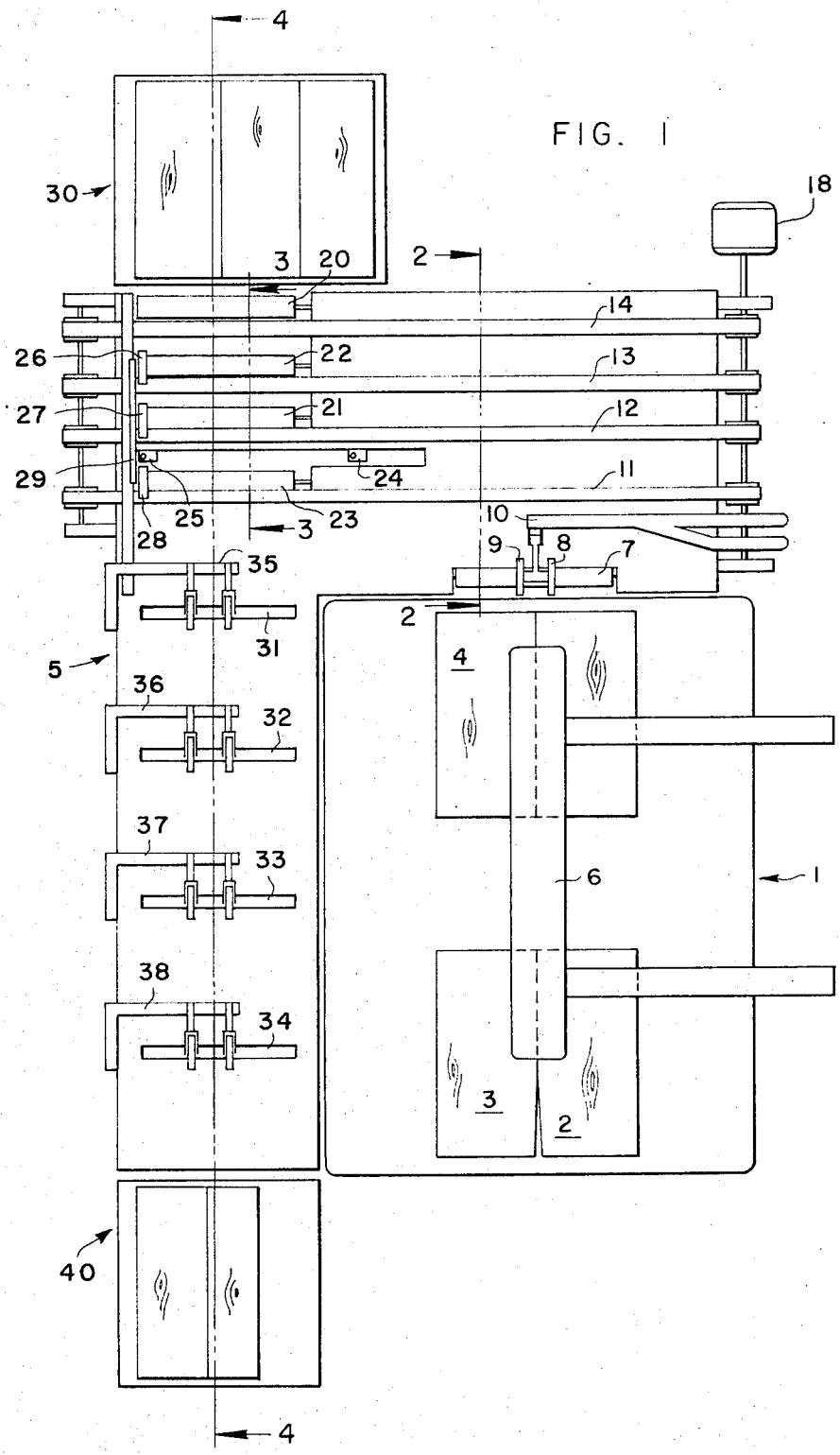
FIG. 1 is a plan view of the material transferring system as used with a veneer splicer.

FIG. 1 illustrates the present invention especially as it may be used in conjunction with a veneer splicer of a type well known in the wood veneer art. Strips of veneer 2 and 3 are fed into the splicer, generally shown at 1. The strips exit the splicer as one integral piece, such as spliced veneer sheet 4. The width requirements for the finished veneer sheet often dictate that the spliced veneer 4 be returned to the input of the splicer for the splicing on of additional sections of veneer in an endwise fashion to produce greater sheet width. This requires that the sheets of veneer be transferred back to the infeed area of splicer 1. This is accomplished by the materials transfer system of the present invention, generally shown at 5. As the spliced veneer, such as veneer sheet 4, exits splicer hold-down assembly 6, it passes between driving roll 7 and hold-down wheels 8 and 9, which are supported by overhead arm 10.

The tension between driving roll 7 and hold-down wheels 8 and 9 is adjusted to allow sufficient slippage of the veneer while the veneer is in the splicer that the operation of the splicer is not effected while the veneer remains under the slicer hold-down assembly 6. Upon exiting splicer hold-down assembly 6, the action of driving roll 7 and hold-down wheels 8 and 9 move the sheet of spliced veneer laterally across belts 11, 12, 13, and 14. The belts are driven, such as by motor 18, toward transfer rolls 20, 21, 22, and 23, and the belts are inclined slightly from the horizontal.

For proper transfer operation the veneer sheet must be propelled laterally across moving belts 11, 12, 13 and 14 without significant twisting. To that end, hold-down wheels 8 and 9 are preferably integrally connected so that the wheels must turn as one. This prevents the twisting of the veneer while passing between driving roll 7 and whells 8 and 9.

As the sheet of veneer is propelled across the belts 10–14 by the driving action of roll 7 and wheels 8 and 9, the leading edge of the veneer is prevented from catching in the belts by a series of smooth ramps 15 and inclined belt guides 16, providing for the inclination of the belts 11–14. The speed of driving roll 7 is selected to provide the desired clearance between roll 7 and the trailing edge of the veneer sheet as it comes to rest on belts 11–14.

The veneer sheet 4 is then transported along belts 11–14, passing across sensor 24 which is preferably a light sensitive device such as a photoelectric cell. Sensor 24 may be adjustable laterally by the splicer operator and provides a means of sorting the finished veneer sheets from the rest of the sheets as will be explained in greater detail hereinafter. The veneer sheet continues along belts 11–14 crossing driving rolls 20, 21, 22, and 23, then passing across sensor 25 which is also a light sensitive device similar to sensor 24.

In operation, sensors 24 and 25 are set as far apart as the desired width of the finished veneer sheet 4. Accordingly, when the leading edge of the sheet passes across sensor 25, if the trailing edge of the sheet is still covering sensor 24 so that both sensors 24 and 25 are simultaneously covered, sufficient width is indicated. In that event, rolls 20, 21, 22 and 23 will be driven in a first direction (toward the top of the sheet in FIG. 1) to eject the veneer sheet onto a stack of finished sheets as shown for example at 30. On the other hand, if sensor 24 is uncovered when the leading edge of shhet 4 reaches sensor 25, the indication is that the sheet has not attained the desired width of a finished sheet. In that event, rolls 20, 21, 22 and 23 are driven in a second direction (toward the bottom of FIG. 1) to move the sheet into driving contact with rolls 31, 32, 33, and 34, and their respective hold-down idlers 35, 36, 37 and 38. The actuation of sensor 25 also causes arm 29 and its associated idler rollers 26, 27, and 28 to move downwardly, pressing veneer sheet 4 into engaging contact with driven rolls 20–23.

As illustrated best in FIG. 4, rolls 31–34 and their associated idlers are preferably inclined upwardly toward the infeed end of splicer 1. In this manner, sheets of veneer are raised sufficiently so that upon exiting the conveyor they will form a pile of spiced veneer on platform 40 at the proper height for feeding the splicer.

To minimize the amount of reversing of direction of rolls 21–23 that may be required, the control circuitry is preferably designed so that once it senses a finished sheet of veneer it will continue to drive the rolls in the same direction until a narrower sheet of veneer passes the sensors. The rolls will then be reversed and will run in the other direction until another sheet of finished veneer is sensed, in terms of width. It is apparent that other sensing devices such as mechanical sensors could be be used for this purpose if desired.

While in the foregoing specification the invention has been described in considerable detail, it will be understood that such detail is for illustrative purposes only, and that the scope of the invention is to be defined in the appended claims.

I claim:

1. A materials handling system adapted for moving relatively thin, deformable material from a materials processing station to one or more selected locations, said system comprising in combination:
   a. first driving means for engaging said material to move it from said processing station to a first conveying means,
   b. said first conveying means positioned to convey said material at an angle to the direction of movement through said processing station, said first conveying means including material guide means,
   c. first sensing means in operative communication with said first conveying means to sense a first condition of said material on said conveying means,
   d. second sensing means in operative communication with said first conveying means to sense a second condition of said material on said conveying means,
   e. second driving means responsive to said first and second sensing means, said second driving means adapted to move said material in a first direction responsive to said first condition and in a second direction in response to said second condition,
   f. second conveying means to receive said material moved in said second direction, said second conveying means positioned to convey said material at an angle to the direction of conveyance of said first conveying means and toward said processing station.

2. The system of claim 1 wherein said first driving means includes a driving roll and a plurality of cooperating wheels, said material being engaged therebetween.

3. The system of claim 2 wherein said wheels are interconnected for unitary motion.

4. The system of claim 1 wherein said first conveying means is positioned to convey material at approximately 90° to the direction of movement through said processing station.

5. The system of claim 1 wherein said first conveying means includes a plurality of parallel belts.

6. The system of claim 5 wherein said belts are inclined toward said processing station.

7. The system of claim 5 wherein said material guide means includes an inclined ramp adjacent each of said belts, said ramps inclined toward said processing station.

8. The system of claim 1 wherein said first and second sensing means include first and second photoelectric cells respectively.

9. The system of claim 8 wherein said first condition is defined when said material overlies said second photoelectric cell but does not overlie said first photoelectric cell.

10. The system of claim 8 wherein said second condition is defined when said material overlies said first and second photoelectric cells simultaneously.

11. The system of claim 1 wherein said second driving means includes reversible driven rollers adapted to engage said material on its underside, a plurality of idler wheels mounted on a common arm assembly, said idler wheels adapted to engage said material on its top side, said idler wheels being moveable downwardly to press said material into driving contact with said rollers.

12. The system of claim 11 wherein said arm assembly is moveable in response to said first sensing means.

13. The system of claim 1 wherein said second conveying means includes an array of spaced-apart, parallel driven rollers adapted to engage the underside of said material, and a like array of parallel spaced-apart hold-down wheels for holding said material in driving contact with said rollers.

14. The system of claim 13 wherein said array slants upwardly toward said processing station.

15. The system of claim 1 wherein said material is wood veneer sheets having a thickness of from about one-fortieth to one-fourth of an inch.

* * * * *